March 31, 1953     A. H. LAMB     2,633,024
RELATIVE HUMIDITY INDICATOR OF THE
WET AND DRY BULB THERMOMETER TYPE
Filed Jan. 4, 1950
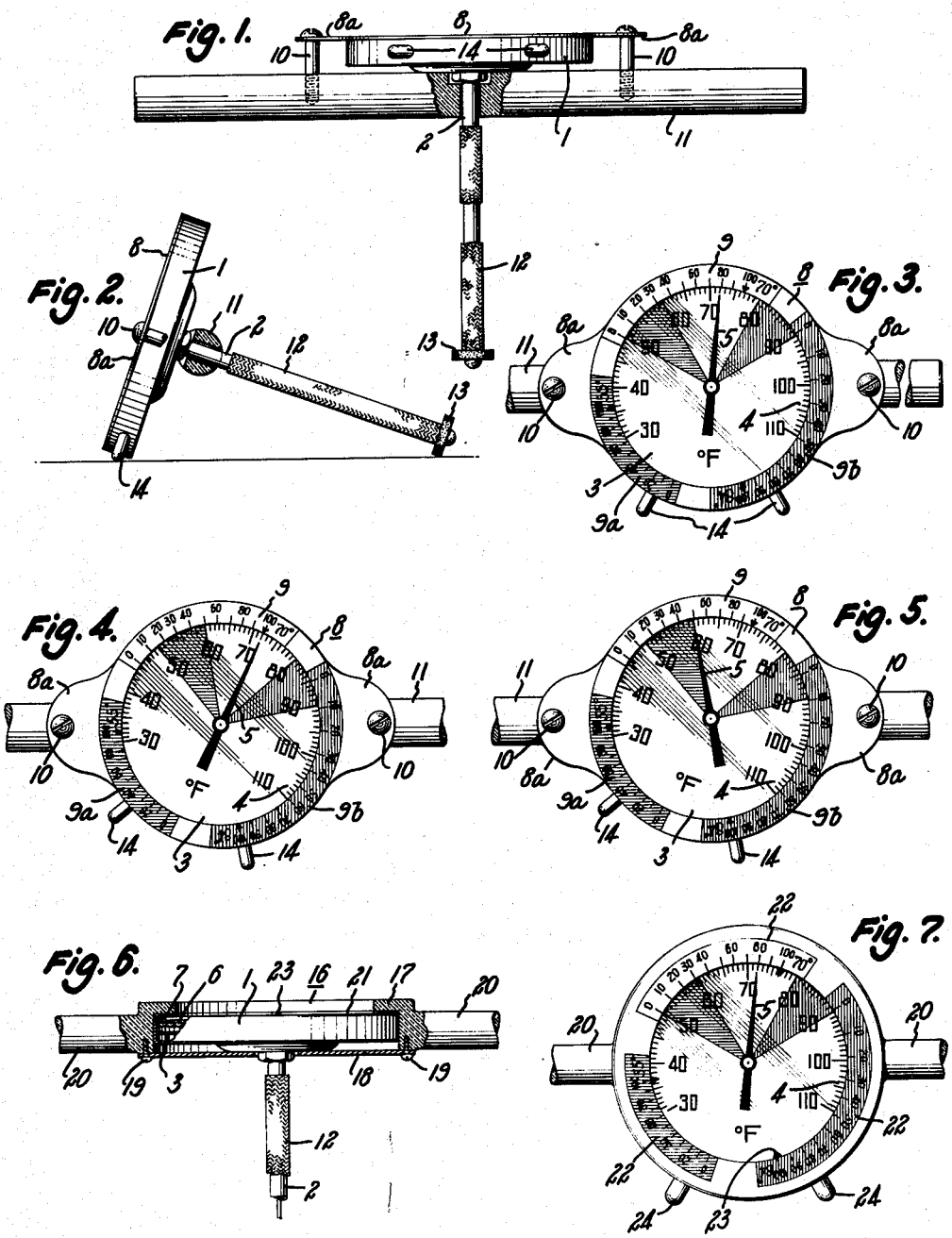
INVENTOR:-
Anthony H. Lamb,
BY
Pierce, Scheffler + Parker,
Attorneys.

Patented Mar. 31, 1953

2,633,024

UNITED STATES PATENT OFFICE 2,633,024

RELATIVE HUMIDITY INDICATOR OF THE WET AND DRY BULB THERMOMETER TYPE

Anthony H. Lamb, Hillside, N. J., assignor to Weston Electrical Instrument Corporation, Newark, N. J., a corporation of New Jersey Application January 4, 1950, Serial No. 136,755

7 Claims. (Cl. 73—338)

This invention relates to relative humidity indicators of the wet and dry bulb thermometer type, and more particularly to relative humidity indicators in which one thermometer is employed as both the wet bulb and the dry bulb thermometer.

Objects of the invention are to provide relative humidity indicators including a single thermometer having a movable index actuated by a temperature-responsive medium, and a movable member carrying indicia relating to humidity; the movable member being adjustable for preselected alinement with the movable index when the temperature-responsive medium is at dry bulb temperature, whereby the position of the movable index along the indicia upon cooling of the medium to wet bulb temperature is significant of humidity. An object is to provide relative humidity indicators as above stated which, after appropriate manipulation, afford direct indications or readings of the dry bulb temperature, the wet bulb temperature, and the relative humidity. An object is to provide a relative humidity indicator comprising a single bimetallic thermometer having a bimetallic element within the end of an elongated hollow stem which projects axially from a short cylindrical casing housing an arcuate temperature scale over which a pointer is displaced by the bimetallic element, a plate bearing a scale of relative humidity and adjustable angularly with respect to the thermometer casing, a wick on the stem, and handles on the casing for rotating the assembly about an axis normal to the stem when the wick is wetted for measurement of wet bulb temperature. A further object is to provide a relative humidity indicator including a single bimetallic thermometer having a wick over the stem, the thermometer including a short cylindrical casing housing an annular scale over which a pointer is displaced by a bimetallic element; and an annular plate bearing graduations of relative humidity; the thermometer casing and annular plate being relatively adjustable to set the 100% relative humidity graduation in line with the pointer position for dry bulb temperature, whereby the pointer position for a measurement of wet bulb temperature also indicates the relative humidity.

These and other objects and the advantages of the invention will be apparent from the following specification when taken with the accompanying drawing in which:

Fig. 1 is an elevation, with parts broken away or in central section, of a relative humidity indicator embodying the invention;

Fig. 2 is an elevation, partly in section, of the indicator as seen from the side when in normal position upon a flat surface;

Fig. 3 is a fragmentary front view of the indicator;

Figs. 4 and 5 are fragmentary front elevations showing the relative locations of the movable elements at the beginning and at the end, respectively, of a measurement of relative humidity;

Fig. 6 is a fragmentary elevation, with parts in section, of another embodiment of the invention, and Fig. 7 is a fragmentary front view of the same.

In the drawings, the reference numeral 1 identifies the short cylindrical casing or head of a bimetallic thermometer of the general type which includes a small diameter hollow stem 2 projecting axially from the rear of the casing to house a helical bimetallic element, not shown, a scale plate 3 within the housing and carrying an arcuate scale 4 of temperature graduations over which a pointer 5 is displaced by the bimetallic element. The casing 1 is preferably of sheet metal, according to present commercial practice, and closed at its forward face by a cover glass 6 through which the scale plate and pointer may be viewed; the cover glass being retained in place by a narrow inturned flange 7 of the metal casing; see Fig. 6. A thermometer of this general type is disclosed in the copending application of Anthony H. Lamb and Edward M. Eadie, Ser. No. 21,144, filed April 15, 1948, now Patent No. 2,502,-159, "Contact Making Thermometer," and the construction of the bimetallic element and of the staff connecting it to the pointer are not shown in the drawings since these details form no part of the present invention.

In accordance with this invention, an approximately annular plate 8 carrying at least one arcuate scale 9 of relative humidity graduations is supported upon the casing 1 for relative angular adjustment of the plate 8 and casing 1. The lines of scale 9 extend to the inner periphery of the annular plate 8, and the 100% graduation is preferably an inwardly directed arrow of distinctive color. The adjustable connection of the parts may be effected, as illustrated in Figs. 1–5, by screws 10 which pass through ears 8a, 8a of the plate 8 and into a cylindrical handle 11 which is centrally apertured to fit over the stem 2 and seat against the rear wall of the casing 1. The screws 10 are turned into the handle 11 to flex the plate 8 to establish a slight frictional resistance which precludes inadvertent annular adjustment of the plate 8 with respect to the casing 1.

An absorbent wick 12 is fitted upon the stem 2 and, if desired, a rubber or plastic washer or end cap 13 may be fitted upon the end of the stem 2 to retain the wick in place and to serve as a rear foot for the indicator when it is placed on a desk or table top, as shown in Fig. 2. The casing 1 is provided with two radial projections or feet 14 to prevent the device from rolling when placed on a flat surface, the feet 14 being preferably so located that the center graduation of the temperature scale 4 is uppermost when the device is supported in stable position, Fig. 2.

The wick 12 is normally dry and the pointer position along the temperature scale 4 indicates the dry bulb temperature, for example 72° as shown in Fig. 3. To measure relative humidity, the casing 1 and plate 8 are adjusted angularly to aline the arrow, i. e., the 100% relative humidity graduation of scale 9, with the thermometer pointer 5, see Fig. 4. The stem 2 is dipped into a glass of water or held under a faucet to wet the wick 12. The ends of the handle 11 are grasped in the fingers of the two hands to spin the device rapidly until the lowest consistent reading is obtained on the temperature scale; for example the 60° F. reading shown in Fig. 5. The pointer 5 then indicates wet bulb temperature on scale 4 and a relative humidity of about 49% on the scale 9, and the arrow or 100% mark of scale 9 indicates the dry bulb temperature.

Although the relative humidity for a given depression of the wet bulb temperature is not constant for all dry bulb temperatures, the relative humidity graduations of scale 9 which are based upon a particular dry bulb temperature are reasonably accurate, say within ± 5%, over a substantial range of dry bulb temperatures. For greater accuracy, the plate 8 may be provided with additional sets of graduations 9a, 9b which are based upon selected dry bulb temperatures below and above, respectively, the dry bulb temperature for which the scale 9 of relative humidity was graduated. The illustrated scale 9 is based upon a dry bulb temperature of 70° F., and scales 9a and 9b are based upon dry bulb temperatures of 55° F. and 84° F. respectively. The relative humidity scale or scales may of course be based upon other dry bulb temperatures within the range which is expected to be of greatest interest. The backgrounds of the plural scales are preferably differentiated by color, with a corresponding coloring of the regions of the dry bulb temperature scale 4 for which the several relative humidity scales are appropriate. As illustrated, the background of the scale 9 is white, and the backgrounds of scales 9a and 9b are blue and red respectively, as indicated by the color hatching on Figs. 3 to 5 and 7.

There is wide latitude in the design and construction of the member which is mounted upon a thermometer to carry a scale or a plurality of scales of relative humidity. Another embodiment of the invention, as shown in Figs. 6 and 7, comprises an annular or cylindrical sleeve member 16 of a transparent plastic with an inturned radial flange 17 against which the outer face of the casing 1 of a bimetallic thermometer is resiliently pressed by a metal plate 18 which is secured to the sleeve member by screws 19. Handles 20 are integral with and project radially from the sleeve member 16 for spinning the assembly to obtain a wet bulb temperature reading when a wick 12 on the thermometer stem is wetted.

A scale plate or annulus of paper of metal 21 is bonded to the lower surface of the flange 17 and carries one or more sets 22 of graduations of relative humidity.

For convenience of reading, the 100% graduation of each set 22 preferably has the form of a radial projector 23 extending inwardly from the flange 17. A pair of lugs or feet 24 are provided on the sleeve member 16 to form a stable support for the indicating device when it is placed on the flat surface of a desk or table.

It is convenient to employ bimetallic thermometers of commercial construction and to provide the scale or scales of relative humidity graduations on an additional element, but the invention also contemplates constructions in which humidity indicia are on an angularly adjustable rim member which constitutes a part of the thermometer casing. Only relatively crude humidity indications are satisfactory for various purposes and, for such use, the humidity graduations may comprise blocks with legends Wet-Moist-Dry in place of percentage humidity.

It therefore is to be understood that the invention is not limited to the embodiments herein illustrated and described or to relative humidity indicators including thermometers of bimetallic type. Thermometers with arcuate scales are preferred for convenience and accuracy since a plurality of relative humidity scales for different dry bulb temperatures may be provided, as shown, on a single scale plate or member. Mercury and other expansible liquid thermometers having arcuate scales of temperature are well known, and the invention may of course be applied to or incorporated in such thermometers of the expansible liquid type.

I claim:

1. A relative humidity indicator comprising the combination with a casing of short cylindrical form housing a scale plate bearing an arcuate temperature scale, a pointer movable over said scale, a stem coaxial with said arcuate temperature scale extending axially from said casing and containing bimetallic temperature-sensitive means for actuating said pointer, and a wick on said stem; of a plate exterior to said casing and carrying an arcuate scale of relative humidity graduations for cooperation with said pointer, and means mounting said plate on said casing for angular adjustment with respect to the axis of said arcuate temperature scale.

2. A relative humidity indicator as recited in claim 1, in combination with handles secured to and extending radially from opposite sides of said casing for spinning said thermometer to promote evaporation of water when said wick is wet.

3. A relative humidity indicator as recited in claim 2, wherein said handles comprise a rod having a bore through which the thermometer stem extends, and bolts extend through said plate and into said rod to hold the same in frictional engagement with said casing.

4. A relative humidity indicator as recited in claim 1, wherein said plate is annular and comprises the inturned radial flange of a cylindrical sleeve member fitted over said thermometer casing, and mounting means retains said casing within said sleeve member and establishes a frictional resistance to relative angular movement of said sleeve member and said casing.

5. A relative humidity indicator as recited in claim 4, in combination with handles projecting radially from opposite sides of said sleeve member for spinning said thermometer to promote evaporation when said wick is wet.

6. A relative humidity indicator as recited in claim 1, wherein said plate carries a plurality of arcuate scales of relative humidity; the graduations of the individual scales of relative humidity being based upon wet bulb temperature depressions below different dry bulb temperatures.

7. A relative humidity indicator as recited in claim 6, wherein the backgrounds of the individual relative humidity scales are of different colors; and said scale plate of the thermometer is correspondingly colored over bands of temperature as measured by dry bulb, for which the individual scales of relative humidity are appropriate for substantially accurate measurements of relative humidity.

ANTHONY H. LAMB.

REFERENCES CITED

The following references are of record in the file of this patent:

UNITED STATES PATENTS

| Number | Name | Date |
| --- | --- | --- |
| 934,409 | Lee | Sept. 14, 1909 |
| 1,630,341 | Hill | May 31, 1927 |
| 1,890,565 | Austin | Dec. 13, 1932 |
| 1,900,813 | Hill | Mar. 7, 1933 |
| 2,112,555 | Bloch | Mar. 29, 1938 |
| 2,177,630 | Alder | Oct. 31, 1939 |
| 2,260,245 | Wappner | Oct. 21, 1941 |
| 2,276,179 | Ford | Mar. 10, 1942 |
| 2,293,064 | Kahn | Aug. 18, 1942 |

FOREIGN PATENTS

| Number | Country | Date |
| --- | --- | --- |
| 642,783 | France | Sept. 4, 1928 |